(12) United States Patent
Evans Hurson (10) Patent No.: US 10,279,560 B2
(45) Date of Patent: May 7, 2019

(54) FLOOR TILE

(71) Applicant: Agnes Evans Hurson, Warrenpoint (IE)

(72) Inventor: Agnes Evans Hurson, Warrenpoint (IE)

( * ) Notice: Subject to any disclaimer, the term of this patent is extended or adjusted under 35 U.S.C. 154(b) by 0 days.

(21) Appl. No.: 15/738,931

(22) PCT Filed: Jun. 27, 2016

(86) PCT No.: PCT/EP2016/064825
§ 371 (c)(1),
(2) Date: Dec. 21, 2017

(87) PCT Pub. No.: WO2016/207431
PCT Pub. Date: Dec. 29, 2016

(65) Prior Publication Data
US 2018/0178484 A1    Jun. 28, 2018

(30) Foreign Application Priority Data

Jun. 25, 2015 (GB) .................................. 1511201.4

(51) Int. Cl.
*B32B 3/06* (2006.01)
*B32B 3/30* (2006.01)
(Continued)

(52) U.S. Cl.
CPC ............ *B32B 3/30* (2013.01); *B29C 45/0053* (2013.01); *B32B 3/06* (2013.01); *B32B 7/12* (2013.01); *B32B 27/304* (2013.01); *B32B 37/10* (2013.01); *B32B 37/12* (2013.01); *B32B 37/182* (2013.01); *B32B 38/1808* (2013.01); *E04F 15/02038* (2013.01); *E04F 15/02194* (2013.01);
(Continued)

(58) Field of Classification Search
CPC .......... E04F 15/02038; E04F 15/02005; E04F 2201/095; E04F 2201/096; E04F 2201/098; E04F 15/087; B32B 37/24; E04C 2/38
See application file for complete search history.

(56) References Cited

U.S. PATENT DOCUMENTS 4,361,614 A * 11/1982 Moffitt, Jr. .......... A47G 27/0212
156/250
5,323,575 A * 6/1994 Yeh ..................... E04F 21/1844
52/177
(Continued)

FOREIGN PATENT DOCUMENTS

EP        1726737 A2    11/2006
GB        2495790 A      4/2013
(Continued)

OTHER PUBLICATIONS

International Search Report for PCT/EP2016/064825 dated Sep. 27, 2016 (3 pages).*

*Primary Examiner* — Rodney Mintz
(74) *Attorney, Agent, or Firm* — Hoffmann and Baron, LLP (57) ABSTRACT

The present invention relates to a floor tile comprising a base substrate and a laminate layer, wherein the base substrate comprises at least one aligning member on a top surface thereof, the aligning member operable to engage with a complimentary receiver formed in the laminate layer for aligning the laminate layer on the top surface of the substrate.

16 Claims, 14 Drawing Sheets

(51) Int. Cl.
  *B32B 7/12*     (2006.01)
  *B29C 45/00*    (2006.01)
  *B29K 27/06*    (2006.01)
  *B29L 31/10*    (2006.01)
  *B32B 27/30*    (2006.01)
  *B32B 37/10*    (2006.01)
  *B32B 37/12*    (2006.01)
  *B32B 37/18*    (2006.01)
  *B32B 38/18*    (2006.01)
  *E04F 15/02*    (2006.01)
  *E04F 15/10*    (2006.01)

(52) U.S. Cl.
  CPC .......... *E04F 15/105* (2013.01); *E04F 15/107* (2013.01); *B29C 2045/0079* (2013.01); *B29K 2027/06* (2013.01); *B29L 2031/104* (2013.01); *B32B 2255/10* (2013.01); *B32B 2255/26* (2013.01); *B32B 2327/06* (2013.01); *B32B 2419/04* (2013.01); *E04F 2201/0138* (2013.01); *E04F 2201/022* (2013.01); *E04F 2201/043* (2013.01); *E04F 2201/091* (2013.01); *E04F 2201/095* (2013.01)

(56) References Cited

U.S. PATENT DOCUMENTS

| | | | | |
|---|---|---|---|---|
| 8,186,116 B2* | 5/2012 | Anderson | ............... | E01C 5/001 52/181 |
| 8,291,670 B2* | 10/2012 | Gard | ........................ | E04F 15/02 52/662 |
| 8,539,727 B2* | 9/2013 | Lui | .......................... | E04F 13/14 52/384 |
| 8,997,432 B2* | 4/2015 | Gard | ........................ | E04F 15/02 52/662 |
| 9,187,910 B2* | 11/2015 | Tortorella | .......... | A47G 27/0293 |
| 9,771,722 B2 | 9/2017 | Hurson | | |
| 2006/0080910 A1* | 4/2006 | Cornia | .................... | E04F 13/08 52/177 |
| 2006/0260223 A1* | 11/2006 | Wang | .................. | E04F 13/0862 52/177 |
| 2007/0039267 A1* | 2/2007 | Swanson | ................. | E01C 5/223 52/391 |
| 2010/0257801 A1* | 10/2010 | Anderson | ............... | E01C 5/001 52/391 |
| 2011/0113713 A1* | 5/2011 | Lui | .......................... | E04F 13/14 52/391 |
| 2015/0284965 A1* | 10/2015 | Hurson | ............. | E04F 15/02038 52/588.1 |

FOREIGN PATENT DOCUMENTS

| | | |
|---|---|---|
| GB | 2541358 A | 2/2017 |
| WO | 2006027029 A1 | 3/2006 |
| WO | 2011117562 A1 | 9/2011 |
| WO | 2013117653 A2 | 8/2013 |

\* cited by examiner

FLOOR TILE

This application is the U.S. National Phase of, and Applicant claims priority from, International Patent Application Number PCT/EP2016/064825 filed 27 Jun. 2016, which claims priority from GB 1511201.4 filed 25 Jun. 2015, each of which is incorporated herein by reference.

The present invention relates to a floor tile and method of forming same.

More particularly, the present invention relates to a modular flooring system comprising interconnecting floor tiles which is an improvement over that disclosed in United Kingdom Patent Specification No. GB2495790 B, the contents of which are incorporated herein by reference.

SUMMARY OF THE INVENTION

Accordingly, the present invention provides a tile comprising:
 a base substrate and a laminate layer,
 characterised in that base substrate comprises at least one aligning member on a top surface thereof, the aligning member operable to engage with a complimentary receiver formed in the laminate layer for aligning the laminate layer on the top surface of the substrate.

In another embodiment of the invention, the aligning member comprises an upstanding projection on the top surface of the base substrate, and the complimentary receiver comprises a recess formed in the underside of the laminate layer for engagement with the upstanding projection.

Preferably, the upstanding projection is an edge forming a rim that extends along the perimeter of the base substrate.

Preferably, the recess extends along the perimeter of the laminate layer.

Preferably, the recess forms a ledge in the underside surface of the laminate layer, the ledge having a complimentary fit with the rim of the base substrate to align the laminate layer on the base substrate.

In another embodiment of the invention, the aligning member comprises a plurality of upstanding projections forming raised members spaced apart on the top surface of the base substrate.

Preferably, the raised members are cuboid shaped projections.

Alternatively, the raised members are cylindrically shaped projections.

Preferably, the complimentary receiver comprises recesses formed in the underside of the laminate layer for engagement with the raised members to align the laminate layer on the base substrate.

In another embodiment of the invention, the base substrate comprises connecting means for engaging with connecting means of a substrate of a further tile to form an interconnected flooring system.

Preferably, the connecting means comprises a plurality of protruding tongues and grooves at adjacent sides of the base substrate.

Preferably, a protruding tongue or dovetail of the substrate is engaged in a groove of the substrate of another tile to connect adjacent tiles to form the flooring system.

In another embodiment of the invention, engaging the connecting means of a tile with a further tile aligns and positions a side edge of a tile with the side edge of the further tile.

Preferably, the top surface of the base substrate fully extends over the connecting means on at least one side of the substrate.

In another embodiment of the invention, the laminate layer is bonded to the substrate layer using an adhesive.

In a further aspect of the present invention there is provided a method of forming a tile comprising the steps of:
 forming a base substrate having features as set out above,
 forming a laminate layer having features as set out above;
 applying an adhesive to a surface of one or both of the base substrate and laminate layer;
 connecting the laminate layer and the base substrate so that the aligning member of the base substrate engages with the complimentary receiver formed in the laminate layer to thereby align the laminate layer on the top surface of the substrate, and
 bonding the laminate layer to the substrate to form the tile.

In another embodiment of the invention, the method comprises the step of: operating an injection moulding machine to form the base substrate.

In another embodiment of the invention, the method comprises the step of: removing the base substrate from the injection moulding machine and allowing the base substrate to cool.

In another embodiment of the invention, the method comprises the step of: operating a roller coater machine to apply adhesive to a surface of one or both of the base substrate and laminate layer.

In another embodiment of the invention, the method comprises the step of: applying pressure to the laminate layer on the substrate.

Preferably, the step of applying pressure to the laminate layer on the substrate comprises operating a nip-roller machine.

BRIEF DESCRIPTION OF THE DRAWINGS

The present invention will now be described with reference to the accompanying drawings which show, by way of example only, embodiments of the invention. In the drawings.

DETAILED DESCRIPTION

Referring to the drawings, there is shown a tile, indicated generally by the reference numeral 1, comprising a base substrate, indicated generally by the reference numeral 2 and a laminate layer 3, having a top facing surface 21, and a underside surface 22, which sits on a top surface 5 of the base substrate 2 to form a floor tile 1. The base substrate 2 comprises at least one aligning member on a top surface 5 thereof, the aligning member operable to engage with a complimentary receiver formed in the laminate layer 3 for aligning the laminate layer 3 on the top surface 5 of the substrate 2.

With reference to FIGS. 1 to 6, a first embodiment of the invention is shown, in which the aligning member comprises an upstanding projection 4 on the top surface 5 of the base substrate 2, and the complimentary receiver comprises a recess 20 formed in the side edge of the underside surface 22 of the laminate layer 3 for engagement with the upstanding projection 4. As shown, the upstanding projection 4 is an upstanding edge forming a rim 4 that extends along the perimeter of the base substrate 2. The recess 20 also extends along the perimeter of the laminate layer 3 and forms a ledge 20 at the peripheral edge in the underside surface 22 of the laminate layer 3, the ledge 20 having a complimentary fit to seat on the rim 4 of the base substrate 2 to align the laminate layer 3 on the base substrate 2.

Figure 1:
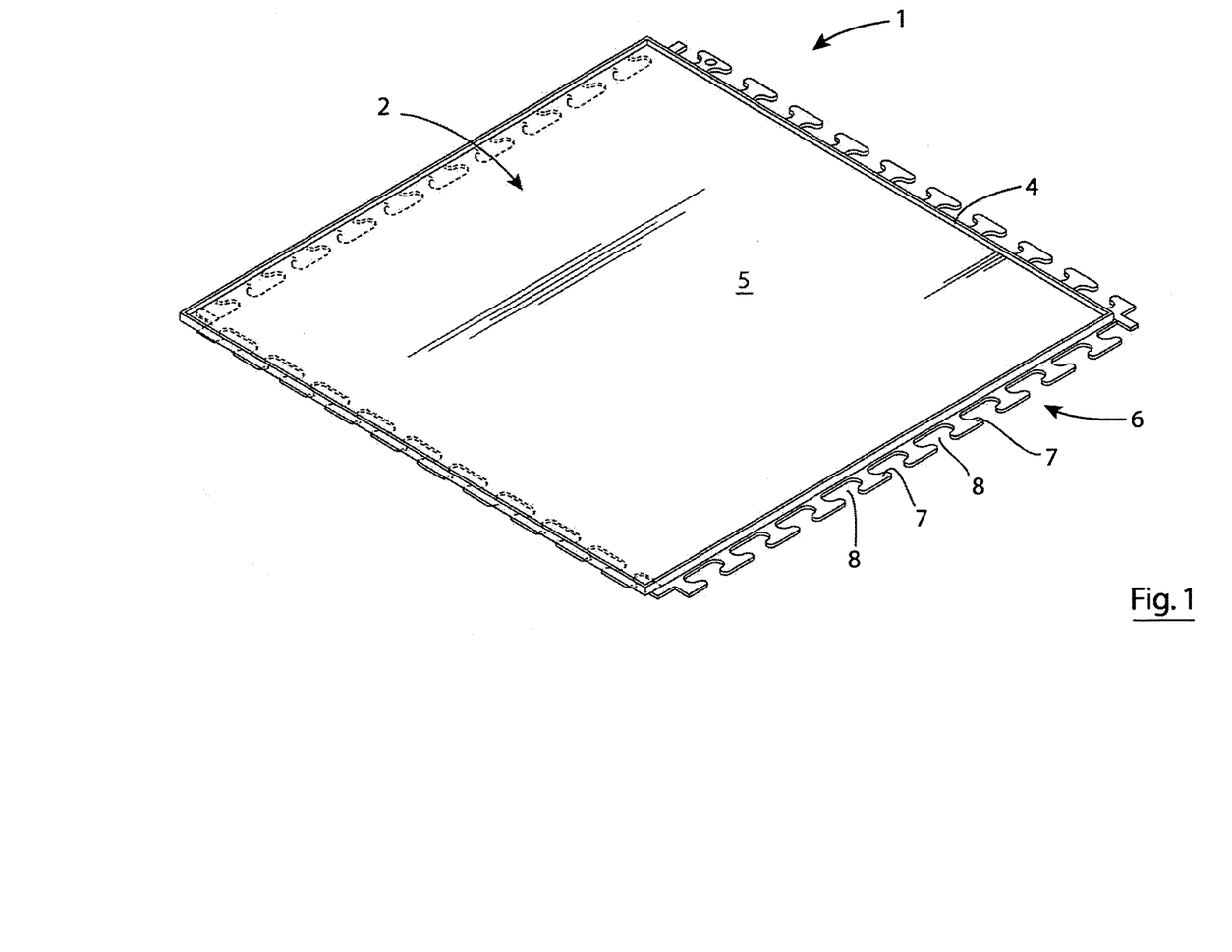
FIG. 1 is a perspective view from above and of a base substrate of a tile according to one embodiment of the invention.
Figure 2:
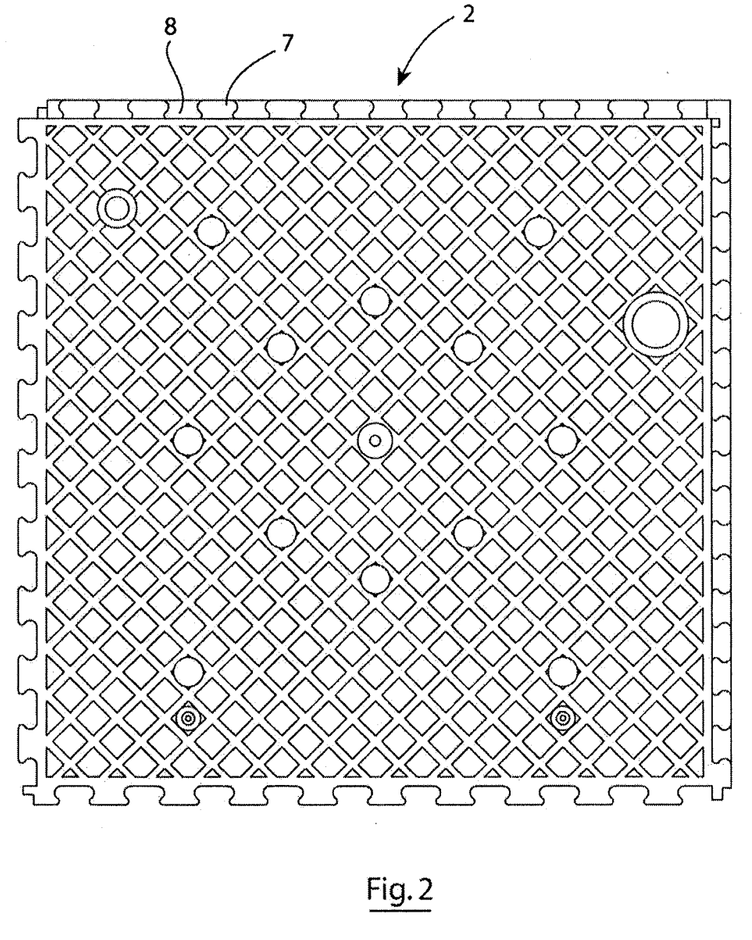
FIG. 2 is an underside view of the base substrate in FIG. 1.
Figure 3:
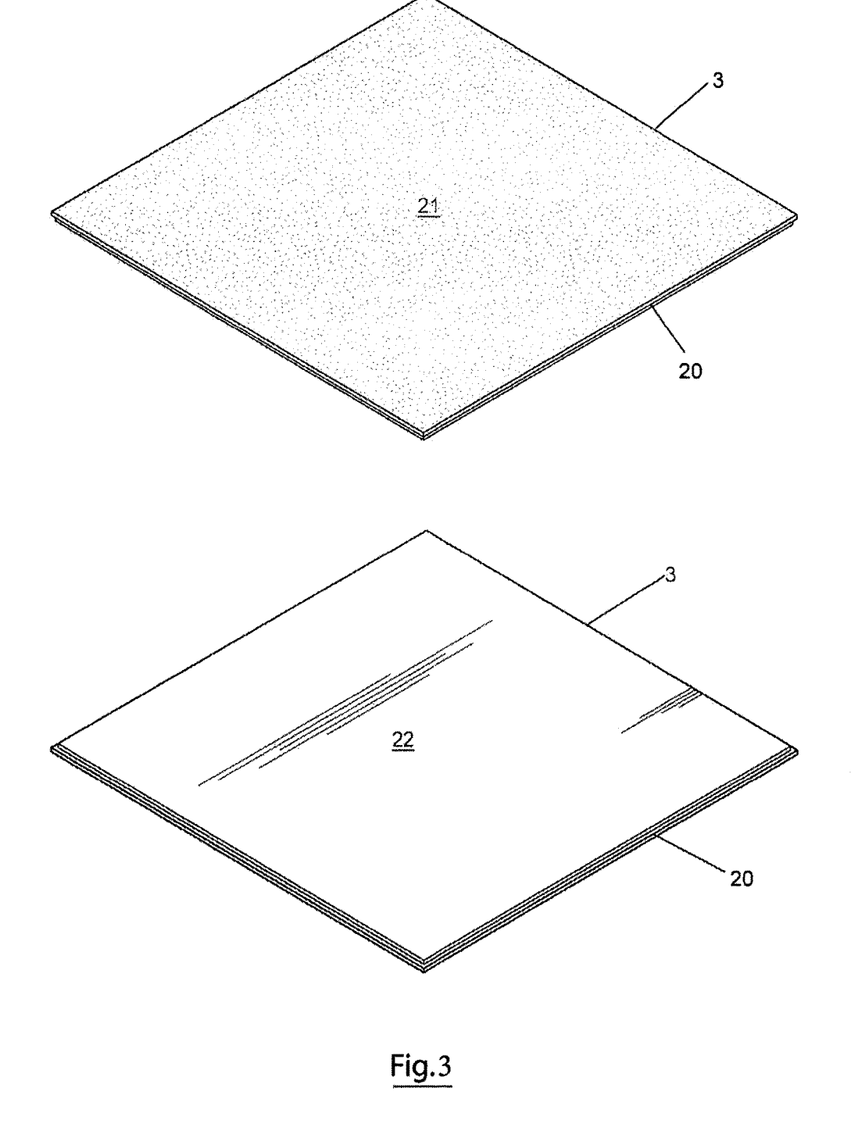
FIG. 3 are perspective views showing sides of a laminate layer adapted for the base substrate shown in FIG. 1.
Figure 4:
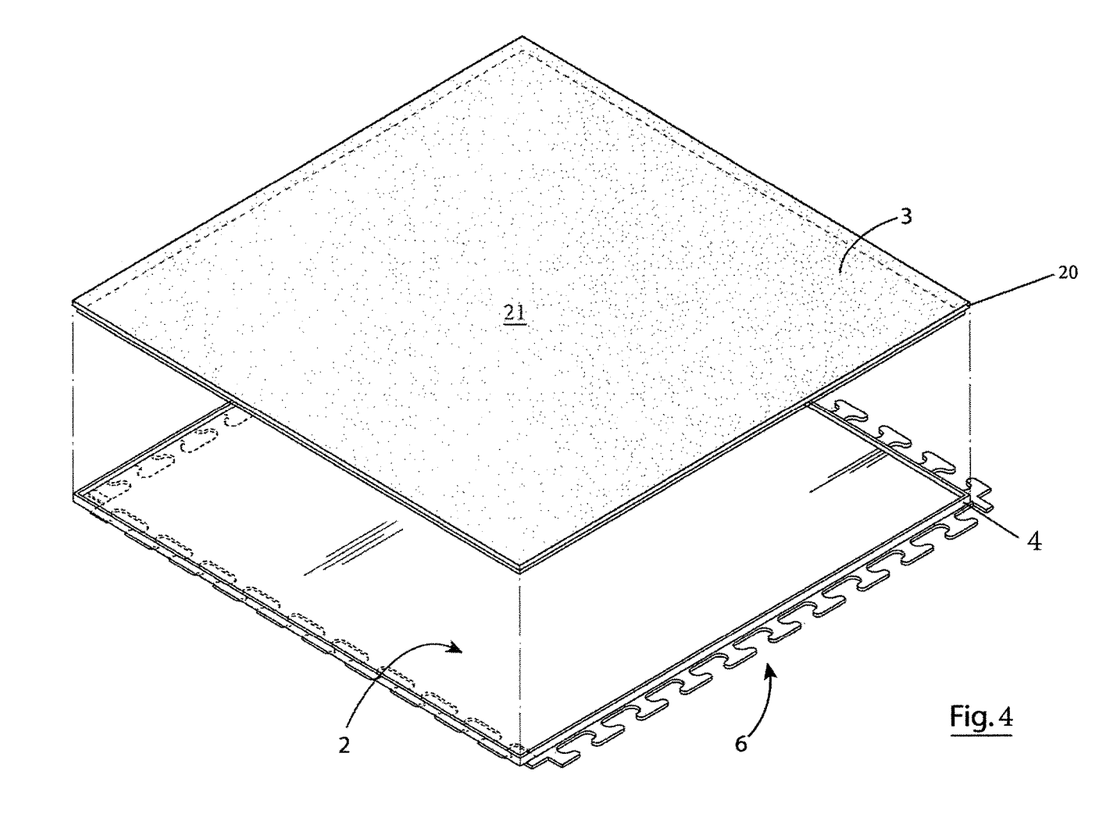
FIG. 4 is a perspective view showing the laminate layer and base substrate of FIGS. 1 and 3 arranged for coupling together to form a tile according to the invention.
Figure 5:
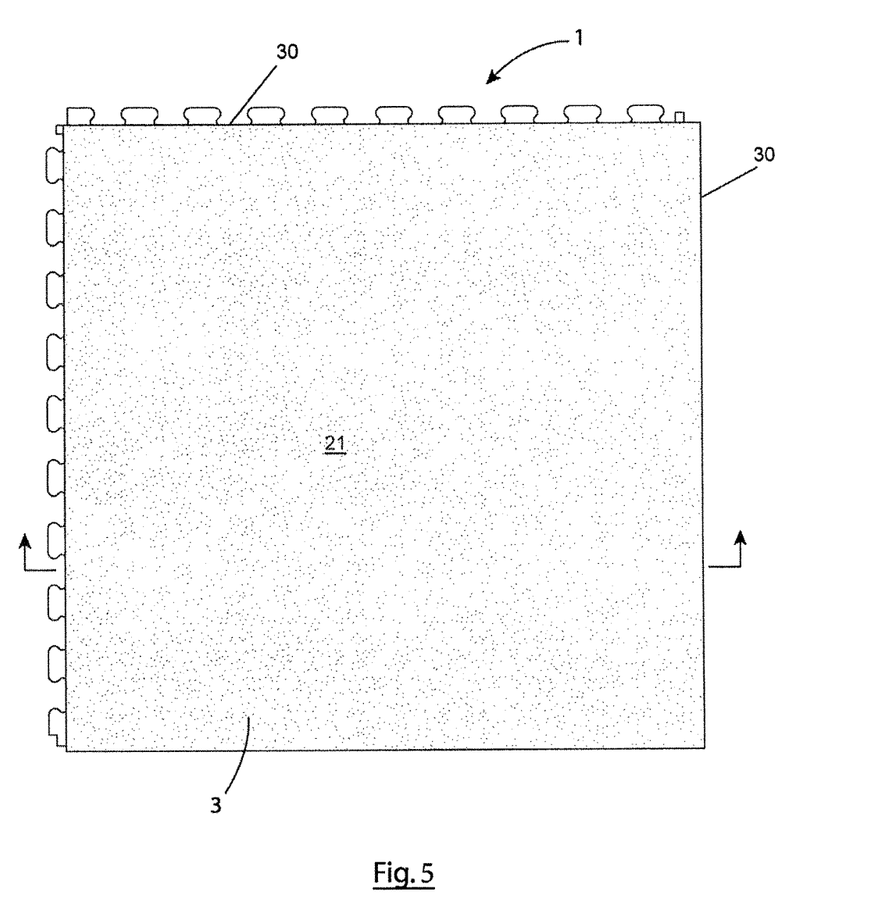
FIG. 5 is a plan view of a tile formed from the laminate layer and base substrate of FIGS. 1 to 3.
Figure 6A:
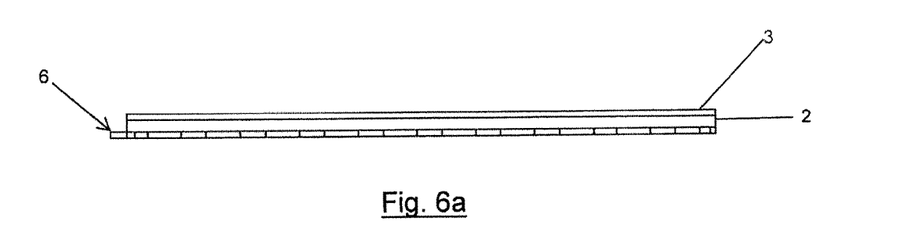
FIGS. 6a and 6b are a sectional side end views of the tile shown in FIG. 5.
Figure 6B:
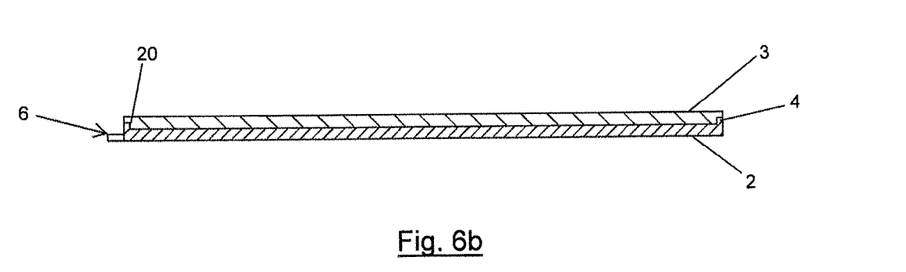
Figure 6C:
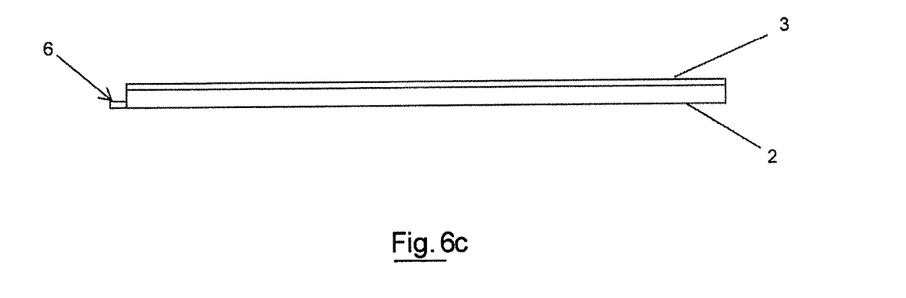
FIG. 6c is a side end view of the tile shown in FIG. 5.
Figure 7:
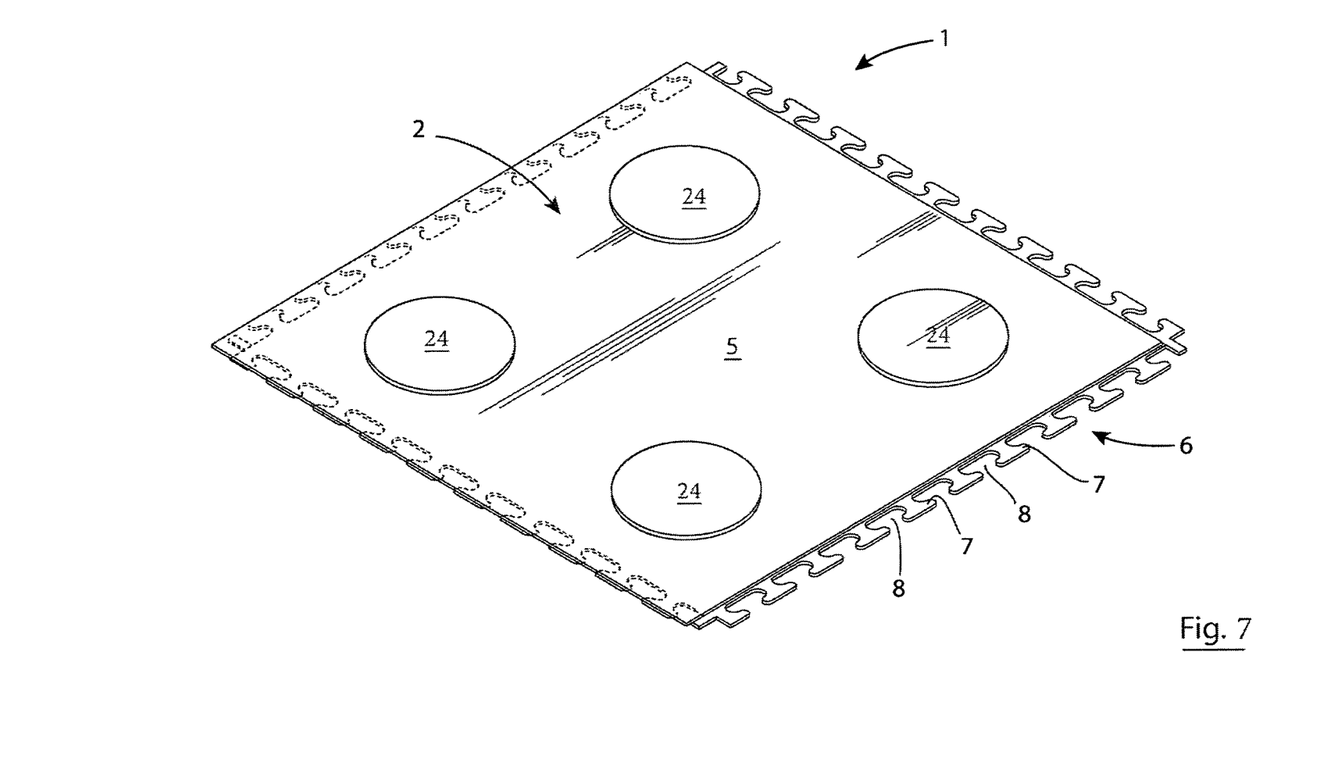
FIG. 7 is a perspective view of a base substrate of a tile according to another embodiment of the invention.
Figure 8:
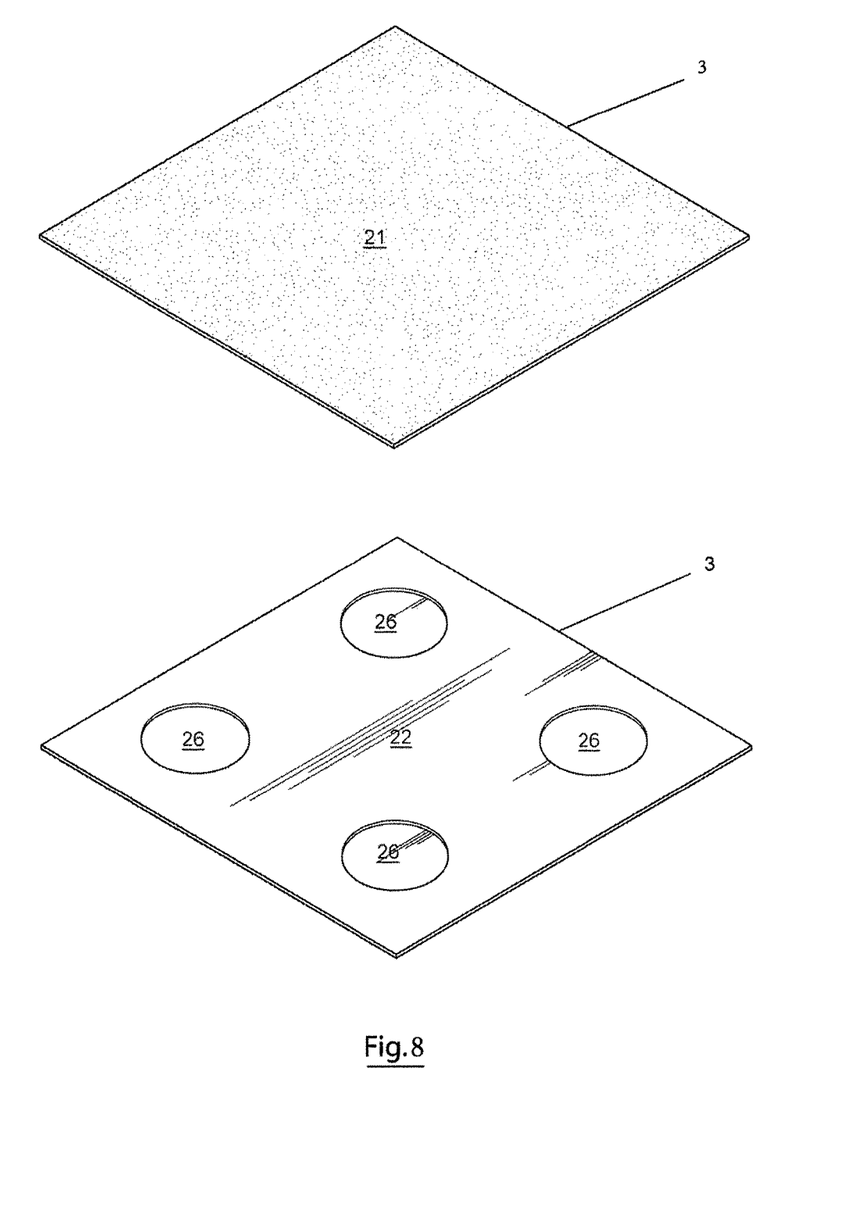
FIG. 8 are perspective views showing sides of a laminate layer adapted for the base substrate shown in FIG. 7.
Figure 9:
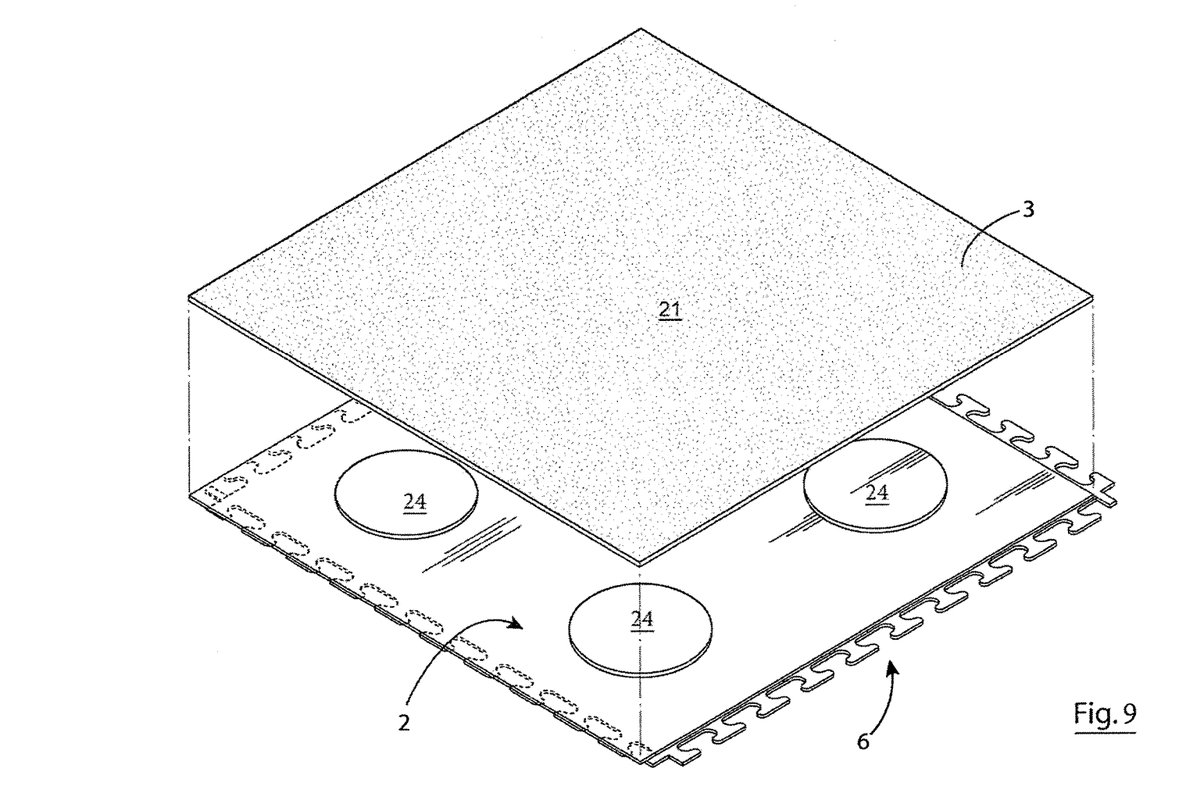
FIG. 9 is a perspective view showing the laminate layer and base substrate of FIGS. 7 and 8 arranged for coupling together to form a tile according to the invention.
Figure 10:
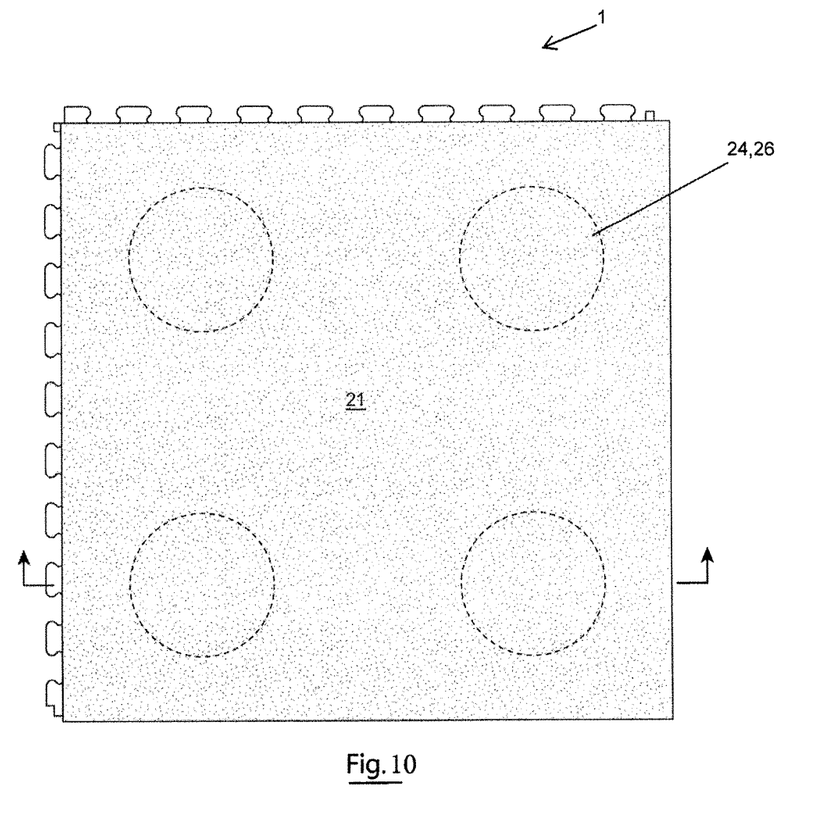
FIG. 10 is a plan view of a tile formed from the laminate layer and base substrate of FIGS. 7 and 8.
Figure 11:
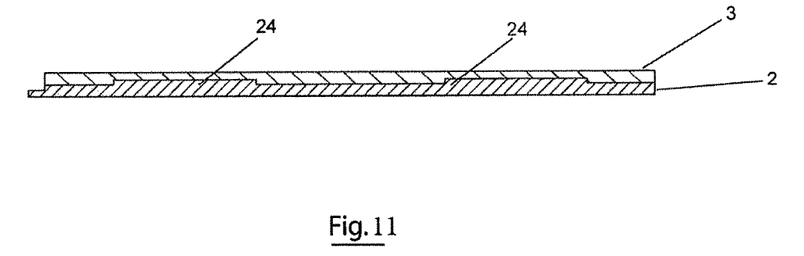
FIG. 11 is a sectional side end views of the tile shown in FIG. 10.

In another embodiment of the invention, as shown in FIGS. 7 to 11, the aligning member comprises a plurality of upstanding projections forming raised members 24 spaced apart and extending upwardly on the top surface 5 of the base substrate 2. The raised members 24 may be cuboid shaped projections, cylindrically shaped projections as shown in FIG. 7, or any other shape as required or as desired. There may also be any number of raised members 24 on the base substrate 2, and although four cylindrically shaped raised members 24 are shown in FIG. 7, this should in no way be seen as essential or limiting on the present invention. A complimentary receiver of the laminate 3 comprises recesses 26 formed in the underside surface 22 of the laminate layer 3 for mutual complimentary engagement with the raised members 24 to align the laminate layer 3 on the base substrate 2. The recesses 26 may have a perimeter slightly larger than the raised members 24 to enable a snug complimentary fit.

Figure 12:
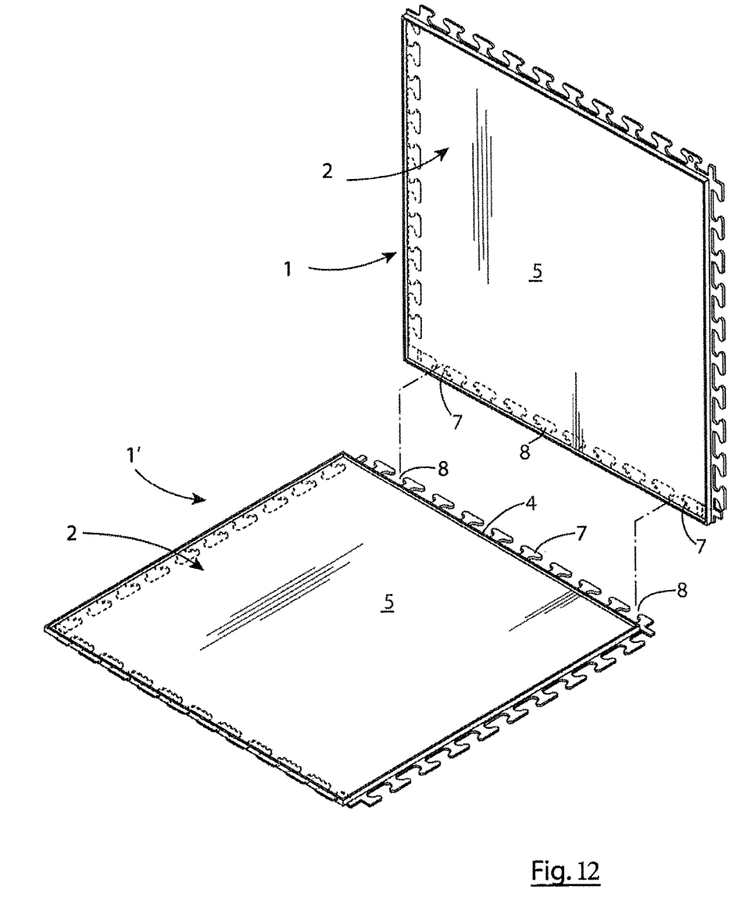
FIG. 12 is a perspective view showing two base substrates according to FIG. 1 being connected.
Figure 13:
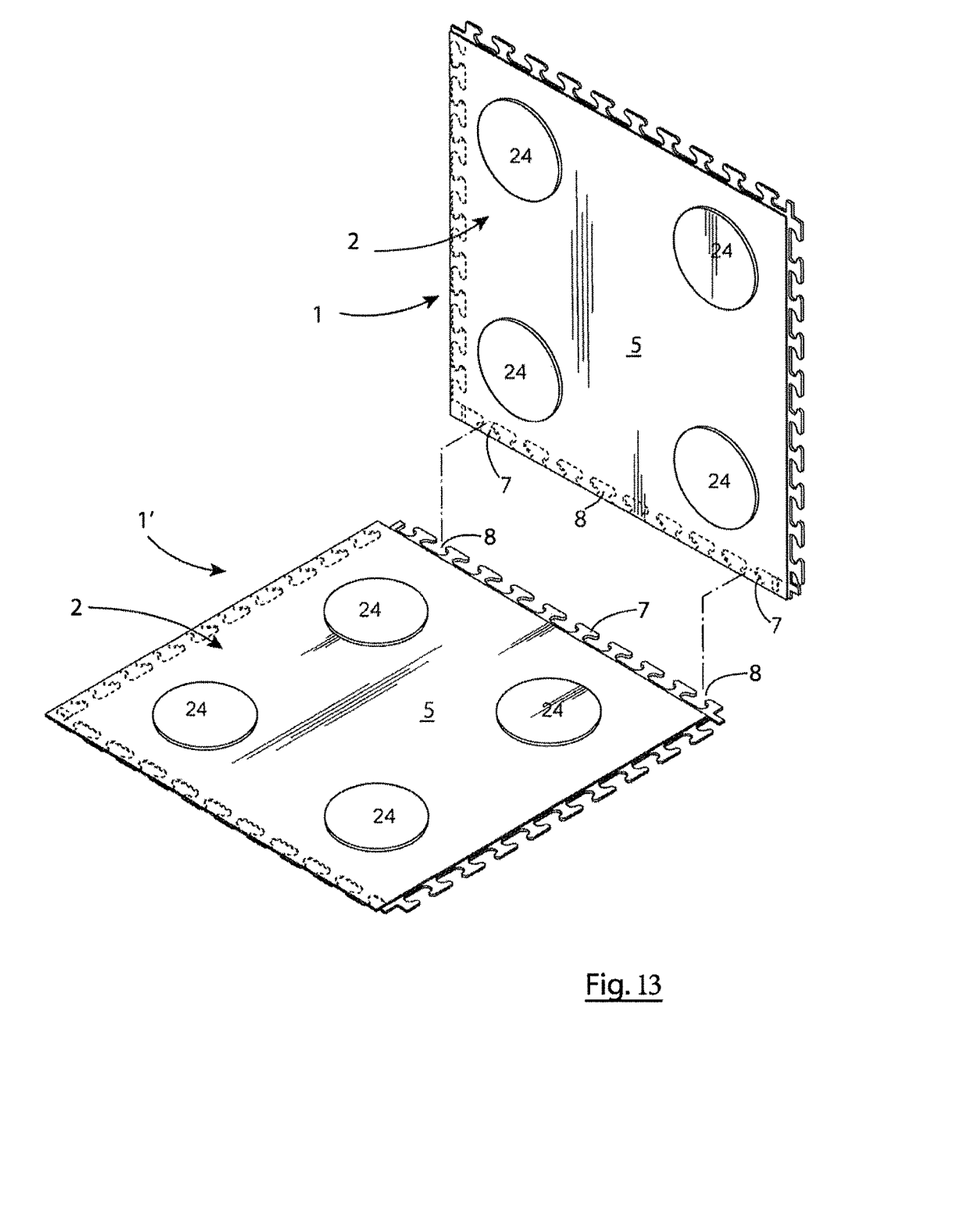
FIG. 13 is a perspective view showing two base substrates according to FIG. 7 being connected.

The base substrate 2 of both embodiments of the present invention also comprise connecting means, indicated generally by the reference numeral 6, for engaging with connecting means 6 of a base substrate 2 of a further tile 1 to form an interconnected flooring system (see FIGS. 12 and 13). The connecting means 6 as shown is a dovetail type connection system comprising a plurality of protruding tongues 7 and grooves 8 at adjacent sides of the base substrate 2, and the top surface 5 of the substrate 2 extends over connecting means 6 on at least one side of the base substrate 2, and preferably on two sides of the base substrate 2.

As shown in FIGS. 12 and 13, the embodiments of FIGS. 1 to 11 comprise the same type of connection system, whereby a protruding tongue 7 of the base substrate 2 of one tile 1 is engaged in a groove 8 of the base substrate layer 2 of another tile 1' to connect adjacent tiles 1, 1' to form a flooring system 10. In FIGS. 12 and 13, for exemplary purposes, the laminate 3 of the tiles 1, 1' is shown removed so that the connecting means 6 of the substrates 2, 2' can be clearly illustrated, and it should be understood that when tiles 1, 1' are being interconnected they may be done so with or without the laminate 3 bonded to the substrate layer 2.

Figure 14:
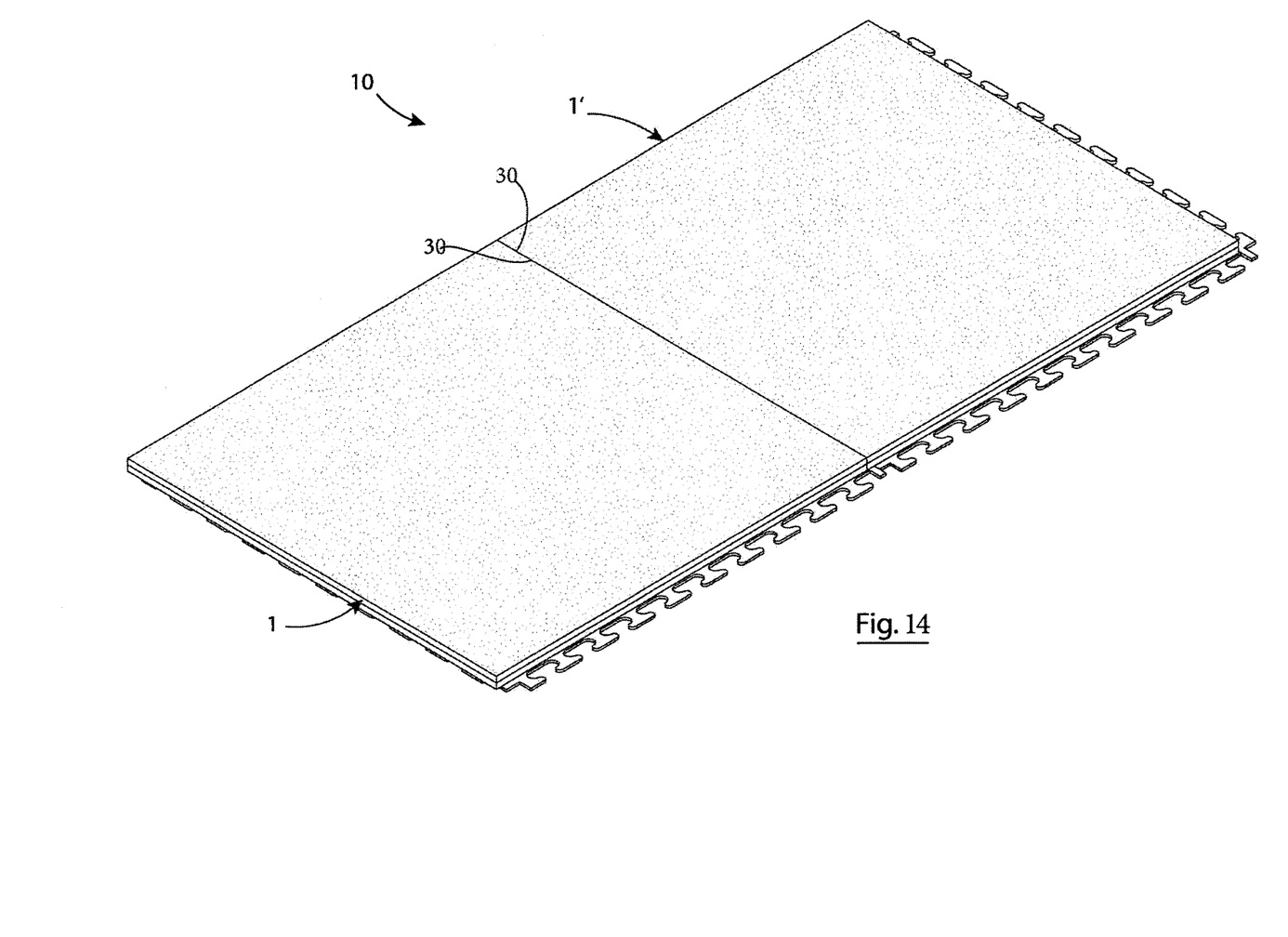
FIG. 14 is a top view showing two interconnected tiles according to the embodiments of FIGS. 1 to 13.
Figure 15:
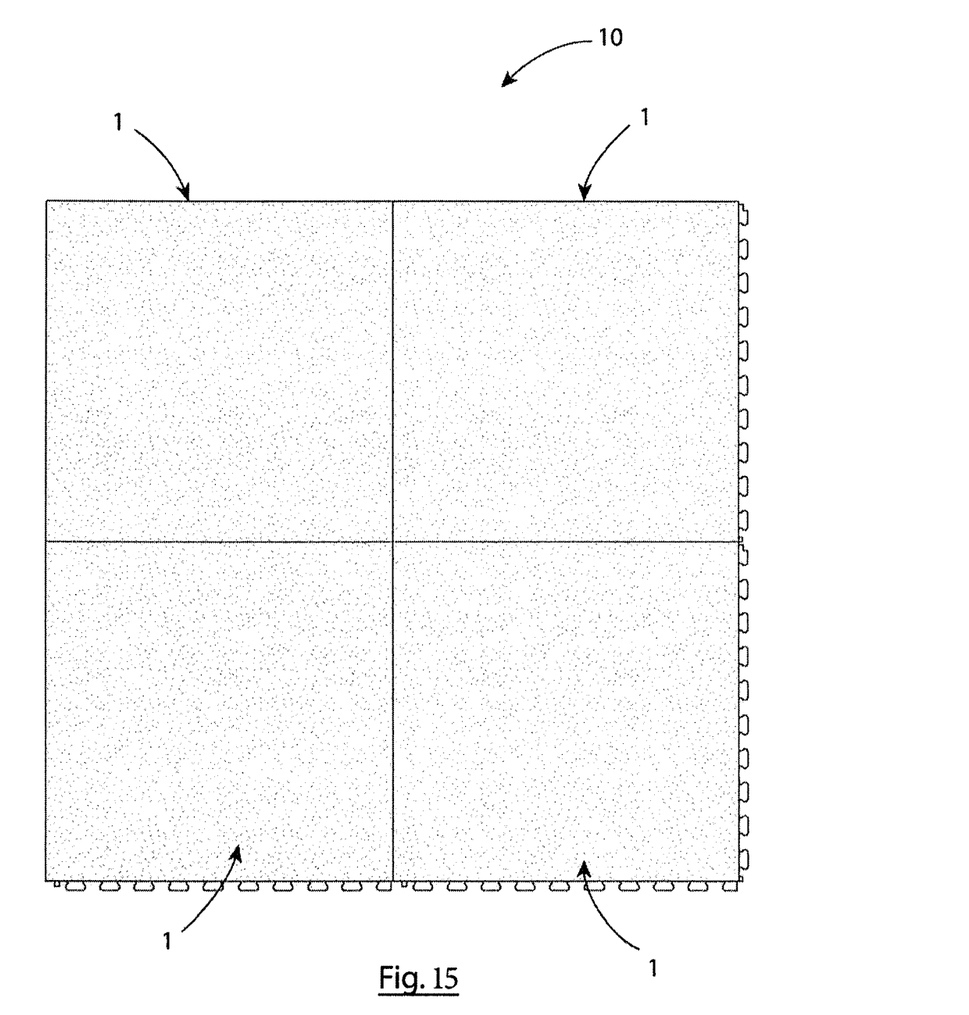
FIG. 15 is a top view showing four interconnected tiles according to the embodiments of FIGS. 1 to 13.

FIGS. 14 and 15 show respectively two and four tiles joined together. As shown, the portion of the top surface 5 of the substrate layer 2 that extends over the connecting means 6 of tile 1 will cover the connecting means 6 of the adjacent tile 1' when the two tiles 1, 1' are interconnected. In this way engaging the connecting means 6 of adjacent tiles 1, 1' aligns and positions a side edge 30 of the tile 1 with the side edge 30' of a further adjacent tile 1' in a side by side arrangement. Notable is that there is no grout line visible between adjacent joined tiles 1, 1' of floor system 10, and a smooth near seamless interconnection is achieved between the side edges 30, 30' of adjacent connected floor tiles 1, 1' according to the present invention. Any number of tiles 1 may be joined to form the required flooring system 10.

There is also provided a method of forming a tile 1 comprising the initial step of forming a base substrate 2 according to the embodiments shown. An injection moulding tool may be fitted to an injection moulding machine an appropriately operated to form the base substrate 2 and the base substrate 2 removed from the machine when formed and allowed to dry. Such a tool is fitted to the machine between the machine plates and secured using mould clamps. Flexible PVC in any of various colours is then vacuum fed to a hopper of the moulding machine and gravity feed into a barrel of the machine where it is melted at between 180-190 degrees Celsius. The injection moulding machine is set to allow a screw inside the barrel to pick up sufficient melted material that is then injected through a nozzle of the barrel and into the closed mould at pre-set speeds and pressures. The mould remains closed for a pre-set time to allow cooling. The mould then opens and the base substrate with a moulded aligning member, that is, with an either upstanding rim or raised members, is manually or automatically ejected from the mould. This moulded interlocking tile substrate 2 is then stacked on cooling racks for about 24 hours. It will be understood that the dimensions for the base substrate may be moulded as required or as desired. The laminate layer 3 according to the invention, with either a recess ledge 22, according to the embodiment of FIGS. 1 to 6, or raised member receiving recesses 26, according to the embodiment of FIGS. 7 to 11 may also be formed using the same process.

Next, an adhesive is applied to a bottom surface of a laminate layer 3. Such a step may be performed by operating a roller coater machine to apply adhesive to the laminate layer. The adhesive may be a hot melt polyurethane adhesive or any other suitable adhesive and the laminate layer 3 may comprise a PVC backing layer, a printed middle layer having a desired surface finish or effect for the tile 1, such as wood, porcelain, plastic etc, and a clear PVC top layer. The laminate layer 3 is sized as appropriate to sit in the nest on the substrate.

Next, the laminate layer 3 is oriented as required and placed onto the base substrate so that the aligning member 4, 24 of the base substrate 2 engages with the complimentary receiver 22, 26 formed in the laminate layer 3 to thereby align the laminate layer 3 on the top surface 5 of the substrate 2. Pressure is then applied to the laminate layer 3 on the substrate 2, such as by operating a nip-roller machine, so that the laminate layer 3 is bonded to the substrate 2 to form the tile 1. The completed interlocking tile 1 is then stacked flat on a cooling rack for a further 24 hours before packaging.

Aspects of the present invention have been described by way of example only and it should be appreciated that additions and/or modifications may be made thereto without departing from the scope thereof as attached in the appended claims.

The invention claimed is:

1. A tile comprising:
a base substrate and a laminate layer, wherein the base substrate comprises at least one aligning member located on a top surface thereof, the aligning member operable to engage with a complimentary receiver formed in the laminate layer for aligning the laminate layer on the top surface of the base substrate, the aligning member comprising an upstanding projection located on the top surface of the base substrate, the upstanding projection being an edge forming a rim that extends continuously along a perimeter of the base substrate, the complimentary receiver comprising a recess formed in an underside of the laminate layer configured for engagement with the upstanding projection, the recess extends continuously along a perimeter of the laminate layer, and the base substrate comprising connecting means having a plurality of protruding tongues or dovetail connectors and grooves positioned at adjacent sides of the base substrate, the connecting means configured for engaging with connecting means of a base substrate of a further tile to form an interconnected flooring system.

2. The tile as claimed in claim 1, wherein the recess forms a ledge in the underside of the laminate layer, the ledge having a complimentary fit with the rim of the base substrate to align the laminate layer on the base substrate.

3. The tile as claimed in claim 1, wherein the protruding tongue or dovetail connectors of the substrate are engaged in grooves of the substrate of another tile to connect adjacent tiles to form the interconnected flooring system.

4. The tile as claimed in claim 1, wherein engaging the connecting means of the tile with the further tile aligns and positions a side edge of the tile against a side edge of the further tile.

5. The tile as claimed in claim 1, wherein the top surface of the base substrate fully extends over the connecting means on at least one side of the substrate.

6. The tile as claimed in claim 1, wherein the laminate layer is bonded to the substrate layer using an adhesive.

7. The tile as claimed in claim 1, wherein the aligning member comprises a plurality of second upstanding projections forming raised members spaced apart on the top surface of the base substrate.

8. The tile as claimed in claim 7, wherein the raised members are cuboid shaped projections.

9. The tile as claimed in claim 7, wherein the raised members are cylindrically shaped projections.

10. The tile as claimed in claim 7, wherein the complimentary receiver comprises corresponding recesses formed in the underside of the laminate layer for engagement with the raised members to align the laminate layer on the base substrate.

11. A method of forming the tile of claim 1, the method comprising the steps of:
forming the base substrate and the laminate layer;
applying an adhesive to a surface of one or both of the base substrate and laminate layer;
connecting the laminate layer and the base substrate so that the aligning member of the base substrate engages with the complimentary receiver formed in the laminate layer to thereby align the laminate layer on the top surface of the base substrate, and
bonding the laminate layer to the base substrate to form the tile.

12. The method for forming a tile as claimed in claim 11 comprising the step of: operating an injection moulding machine to form the base substrate.

13. The method for forming a tile as claimed in claim 11 comprising the step of removing the base substrate from the injection moulding machine and allowing the base substrate to cool.

14. The method for forming a tile as claimed in claim 11 comprising the step of operating a roller coater machine to apply adhesive to a surface of one or both of the base substrate and laminate layer.

15. The method for forming a tile as claimed in claim 11 comprising the step of applying pressure to the laminate layer on the substrate.

16. The method for forming a tile as claimed in claim 11 comprising the step of applying pressure to the laminate layer on the substrate comprises operating a nip-roller machine.

* * * * *